(12) United States Patent
Tsuchihara et al.

(10) Patent No.: US 11,420,693 B2
(45) Date of Patent: Aug. 23, 2022

(54) WORKING MACHINE

(71) Applicant: KOBELCO CONSTRUCTION MACHINERY CO., LTD., Hiroshima (JP)

(72) Inventors: Tatsuya Tsuchihara, Hiroshima (JP); Yasunari Watanabe, Hiroshima (JP); Daijiro Yamamoto, Hiroshima (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 135 days.

(21) Appl. No.: 16/902,460

(22) Filed: Jun. 16, 2020

(65) Prior Publication Data

US 2020/0398914 A1    Dec. 24, 2020

(30) Foreign Application Priority Data

Jun. 18, 2019  (JP) .............................. JP2019-113067

(51) Int. Cl.
*B62D 55/14*    (2006.01)
*B62D 55/06*    (2006.01)
(Continued)

(52) U.S. Cl.
CPC .............. *B62D 55/14* (2013.01); *B62D 55/06* (2013.01); *B62D 55/0847* (2013.01);
(Continued)

(58) Field of Classification Search
CPC ........ B62D 55/14; B62D 55/06; B62D 55/10; B62D 55/18; B62D 55/32; B62D 55/0847;
(Continued)

(56) References Cited

U.S. PATENT DOCUMENTS 4,082,371 A * 4/1978 Werner .............. B62D 55/0847
                                                    305/109
4,500,139 A * 2/1985 Tucek .................. B62D 55/116
                                                    305/128
(Continued)

FOREIGN PATENT DOCUMENTS

JP    05-305882 A    11/1993
JP    07-021487 U     4/1995
(Continued)

OTHER PUBLICATIONS

Extended European Search Report dated Nov. 11, 2020 in corresponding European Patent Application No. 201801644, 6 pages.

*Primary Examiner* — Jacob D Knutson
*Assistant Examiner* — Abigail R Hymel
(74) *Attorney, Agent, or Firm* — Oblon, McClelland, Maier & Neustadt, L.L.P.

(57) ABSTRACT

A working machine includes a track guide for restraining a crawler belt from displacement in a left-and-right direction. The track guide includes a front attachment member and a rear attachment member each detachably attached to a crawler frame, and a right contact plate member and a left contact plate member laid between the front attachment member and the rear attachment member. Each of the right contact plate member and the left contact plate member includes a restraint plate and a reinforcement plate, and is supported on the front attachment member and the rear attachment member with an outer surface of the restraint plate and an upper surface of the reinforcement plate both being in surface contact with the front attachment member and the rear attachment member.

4 Claims, 9 Drawing Sheets

(51) Int. Cl.
    *B62D 55/10*     (2006.01)
    *B62D 55/18*     (2006.01)
    *E02F 9/02*     (2006.01)
    *B62D 55/084*     (2006.01)
    *E02F 3/32*     (2006.01)

(52) U.S. Cl.
    CPC ............ *B62D 55/10* (2013.01); *B62D 55/18* (2013.01); *E02F 9/02* (2013.01); *E02F 3/32* (2013.01)

(58) Field of Classification Search
    CPC ........ B62D 55/08; B62D 55/26; B62D 55/28; E02F 9/02
    See application file for complete search history.

(56) References Cited

U.S. PATENT DOCUMENTS

| | | |
|---|---|---|
| 7,901,015 B1 | 3/2011 | Anderson |
| 2016/0159414 A1* | 6/2016 | Hansen ................ B62D 55/084 305/185 |

FOREIGN PATENT DOCUMENTS

| | | |
|---|---|---|
| JP | 9-240523 A | 9/1997 |
| JP | 2009-107547 A | 5/2009 |

* cited by examiner

WORKING MACHINE

TECHNICAL FIELD

The disclosed technique relates to a working machine such as a hydraulic excavator.

BACKGROUND ART

A working machine such as a hydraulic excavator includes a lower travelling body and a machine body mounted on the lower travelling body. The machine body includes an attachment having a boom, an arm, and a bucket, for example. The working machine is configured to perform work such as excavation by hydraulically controlling the attachment.

The lower travelling body includes a pair of left and right crawler track units. Specifically, each of the pair of crawler track units includes a crawler frame extending in a front-and-rear direction, and the crawler frame rotatably supports an idler wheel and a drive wheel at its front and rear ends. Each crawler track unit includes a crawler belt having a plurality of shoe plates (a plurality of shoes) interconnected by a plurality of track links adjacent to one another, the crawler belt being wound in a loop around the drive wheel and the idler wheel. The drive wheel is rotationally driven to circulate the crawler belt. The lower travelling body configured in this manner is capable of travelling over rough ground at, for example, a construction site.

Each of the pair of crawler track units further includes a plurality of guide rollers. The plurality of guide rollers include upper guide rollers disposed between the drive wheel and the idler wheel and rotatably supported on an upper part of the crawler frame, and lower guide rollers disposed between the drive wheel and the idler wheel and rotatably supported on a lower part of the crawler frame. The lower guide roller comes into contact with the track links of the crawler belt to thereby guide the crawler belt. Generally, each crawler track unit includes a track guide for restraining the track link from excessive lateral displacement (displacement in a left-and-right direction). This makes it possible to prevent disengagement of the crawler belt.

Japanese Unexamined Patent Publication No. 2009-107547, Japanese Unexamined Utility Model Publication No. Hei 7-21487, and Japanese Unexamined Patent Publication No. Hei 5-305882 disclose techniques relating to the track guide. Japanese Unexamined Patent Publication No. 2009-107547 discloses a construction machine including a track guard for restricting movement of a crawler track in a widthwise direction orthogonal to a moving direction of the crawler track and a member, attached to the track guard, for removing deposits on the crawler track out of the crawler track. Japanese Unexamined Utility Model Publication No. Hei 7-21487 discloses a track guide device including a fork bracket having left and right downward projecting pieces and attached to a lower end of a track frame, and track guide members detachably attached to respective ones of the projecting pieces of the bracket in such a way as to enclose the respective projecting pieces. Japanese Unexamined Patent Publication No. Hei 5-305882 discloses a technique of forming a track guard by attaching three or more track guard segments to one another in a front-and-rear direction in order to facilitate replacement of the track guard.

By the way, the track guide is liable to be worn by the contact with the track link. Moreover, the track link tends to be more easily worn than the track guide. The work of replacing the track link includes detaching the crawler belt from the crawler frame and dismantling it, which is therefore more troublesome than the work of replacing the track guide. Furthermore, the cost required to replace the track link is higher than the cost required to replace the track guide.

Therefore, it is desired to find ways to suppress the wear of not only the track guide but also a guided portion of the crawler belt, such as the track link, to thereby reduce the burden of replacing both of these components.

SUMMARY OF INVENTION

It is a primary object of the disclosed technique to provide a working machine capable of suppressing the wear of both the track guide and the guided portion and reducing the burden of replacing these components.

Provided is a working machine comprising a lower travelling body including a pair of crawler track units, and a machine body mounted on the lower travelling body.

Each of the pair of crawler track units includes an idler wheel and a drive wheel, a crawler frame rotatably supporting the idler wheel and the drive wheel at a front end portion and a rear end portion of the crawler frame, a crawler belt having a belt body wound in a loop around the idler wheel and the drive wheel and a guided portion projecting inward from an inner surface of the belt body, the crawler belt being circulated by driving the drive wheel, a lower guide roller, rotatably supported on a lower part of the crawler frame, for guiding the crawler belt in a circular motion, and a track guide for restraining the crawler belt from displacement in a left-and-right direction.

The track guide includes a front attachment member and a rear attachment member disposed respectively in front of and behind the lower guide roller and extending along a rotational axis of the lower guide roller, each of the attachment members being detachably attached to the crawler frame, a right contact plate member laid between a right end portion of the front attachment member and a right end portion of the rear attachment member, and a left contact plate member laid between a left end portion of the front attachment member and a left end portion of the rear attachment member.

Each of the right contact plate member and the left contact plate member includes a restraint plate having an inner surface facing inward in the left-and-right direction and an outer surface facing outward in the left-and-right direction, and a reinforcement plate projecting outward from the outer surface of the restraint plate in the left-and-right direction and having an upper surface. The guided portion is configured to be capable of passing through between the restraint plate of the right contact plate member and the restraint plate of the left contact plate member during the circular motion of the crawler belt, with a gap left between the inner surface of each restraint plate and the guided portion. The right contact plate member is configured to restrain the guided portion from rightward displacement by contact of the inner surface of the restraint plate of the right contact plate member with the guided portion due to rightward displacement of the crawler belt with respect to the crawler frame. The left contact plate member is configured to restrain the guided portion from leftward displacement by contact of the inner surface of the restraint plate of the left contact plate member with the guided portion due to leftward displacement of the crawler belt with respect to the crawler frame. Each of the right contact plate member and the left contact plate member is supported on the front attachment member and the rear attachment member with both the outer surface of the restraint plate and the upper surface of the reinforcement plate being in surface contact with the front attachment member and the rear attachment member.

DESCRIPTION OF EMBODIMENTS

Hereinafter, an embodiment of the disclosed technique will be described in detail with reference to the accompanying drawings. It should be understood that the following description is merely illustrative in nature and is not intended to limit the application and use of the present invention in any way. In some of the drawings, directions such as up and down, front and rear, and left and right are indicated by arrows. These directions are defined with respect to the direction in which a lower travelling body of a working machine moves forward and backward. Specifically, the front-and-rear direction of the lower travelling body is a horizontal direction in which a crawler frame described later extends, the left-and-right direction of the lower travelling body is a horizontal direction orthogonal to the front-and-rear direction, and the up-and-down direction of the lower travelling body is a direction parallel to a slewing axis of an upper slewing body.

[Work Machine]

Figure 1:
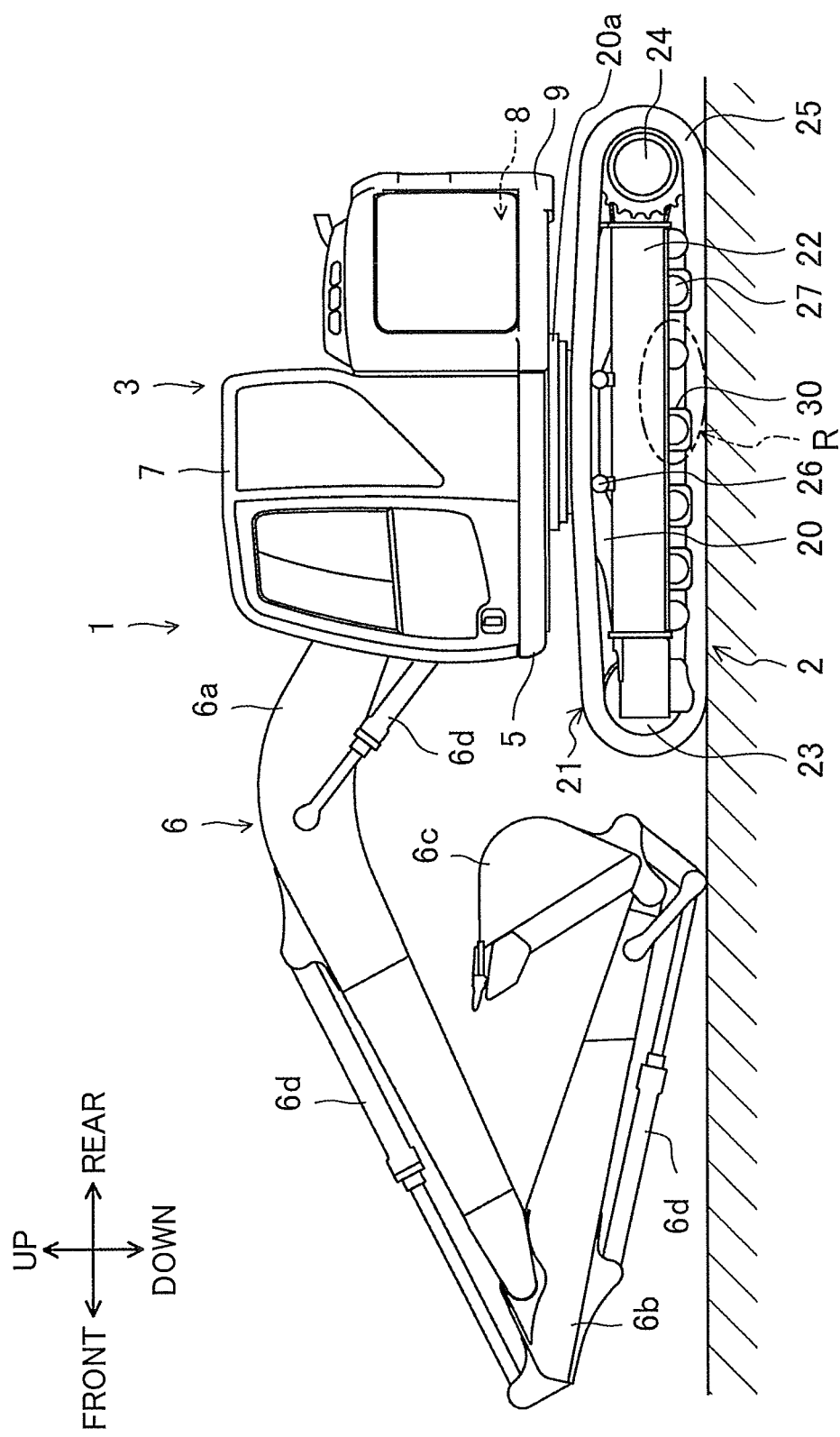
FIG. 1 is a schematic side view of a hydraulic excavator to which the disclosed technique can be suitably applied.

FIG. 1 is a side view of a hydraulic excavator 1 serving as an example of a working machine to which the disclosed technique can be suitably applied. The hydraulic excavator 1 includes a lower travelling body 2 and an upper slewing body 3 (an example of a machine body) mounted on the lower travelling body 2. The upper slewing body 3 includes an upper frame 5 rotatably supported on the lower travelling body 2, and an attachment 6, a cab 7, and a machine chamber 8 disposed on the upper frame 5, for example.

The attachment 6 is disposed on a front portion of the upper frame 5. The attachment 6 includes a boom 6a, an arm 6b, and a bucket 6c, for example. These components of the attachment 6 including the boom 6a are actuated by extension and retraction of a plurality of hydraulic cylinders 6d, which are hydraulically driven and controlled, to perform work such as excavation. The control operation of the boom 6a and the other attachment components is performed in the cab 7. The cab 7 is a driver's cabin in the shape of a box having, for example, a rectangular shape in plan view. The cab 7 is disposed on a front left portion of the upper frame 5 and adjacent to the attachment 6.

The machine chamber 8 is disposed on a rear portion of the upper frame 5. The machine chamber 8 houses drive devices for driving the hydraulic excavator 1, such as an unillustrated engine and hydraulic pumps. At a rear end of the upper frame 5, a counterweight 9 is disposed to keep a balance with the attachment 6 so that a balance is achieved between the front and rear of the upper frame 5.

[Lower Travelling Body]

The lower travelling body 2 includes a support body 20 and a pair of crawler track units 21, 21. The paired crawler track units 21, 21 are attached to left and right sides of the support body 20. In a central portion of the support body 20, a slewing motor 20a, which is hydraulically controlled, is disposed. The upper frame 5 is rotatably supported on the support body 20 in such a way as to be able to rotate according to movement of the slewing motor 20a.

Each of the pair of crawler track units 21, 21 includes a crawler frame 22, an idler wheel 23, a drive wheel 24, a crawler belt 25, a plurality of upper guide rollers 26, a plurality of lower guide rollers 27, and one or a plurality of track guides 30. The paired crawler track units 21, 21 have the same structure except that they are symmetrical. Therefore, the structure of one of the paired crawler track units 21, 21 will be mainly described below.

The crawler frame 22 has a longer dimension in the front-and-rear direction and is made of a beam with high rigidity, for example. The inner portion of the crawler frame 22 in a width direction (the left-and-right direction) is supported on the support body 20. The idler wheel 23 is rotatably supported at a front end portion of the crawler frame 22, and the drive wheel 24 is rotatably supported at a rear end portion of the crawler frame 22. The drive wheel 24 is hydraulically controlled and driven to rotate in a forward direction and a reverse direction at a speed corresponding to a control operation.

Figure 4:
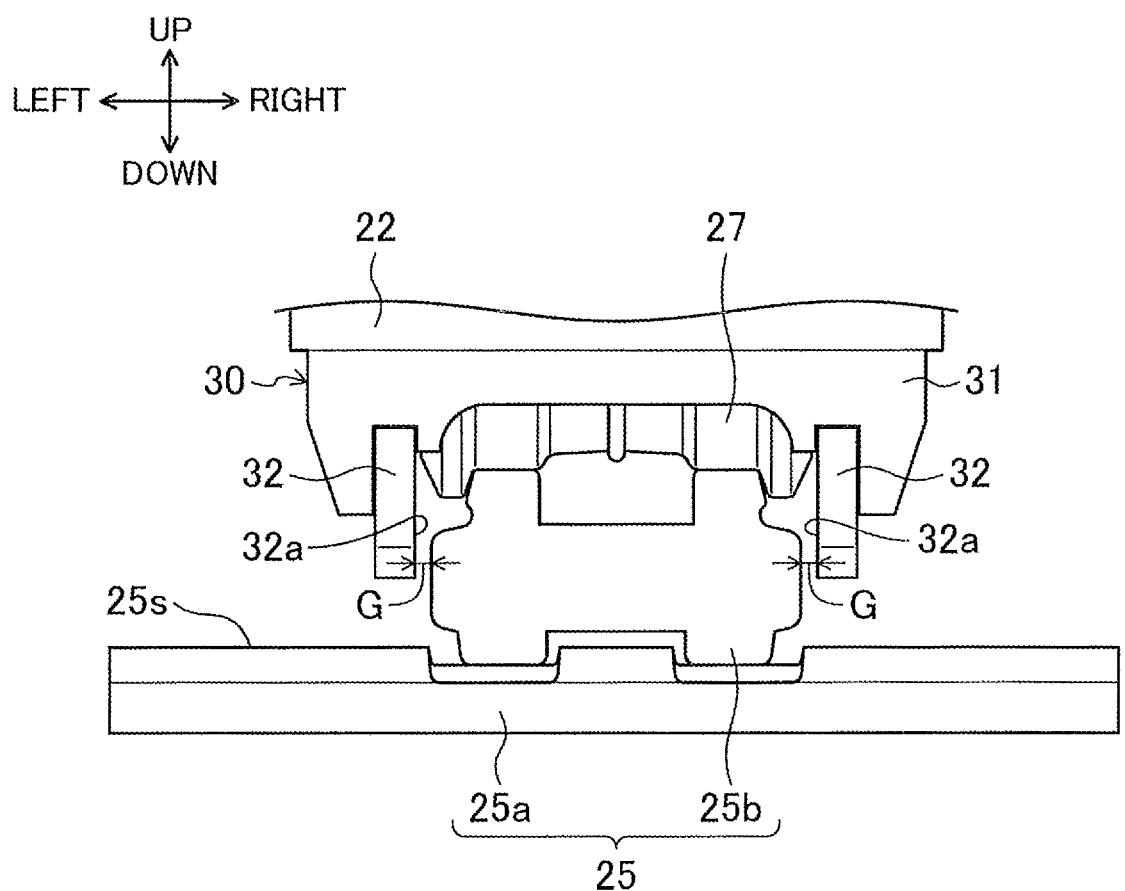
FIG. 4 is a schematic view showing relative positions of the track guide before the improvement and a crawler belt.

The crawler belt 25 includes a belt body wound in a loop around the idler wheel 23 and the drive wheel 24, and a plurality of guided portions projecting inward from an inner surface 25s of the belt body. As shown in FIG. 4, in the present embodiment, the belt body is constituted by a plurality of shoe plates (a plurality of track shoes 25a), and the plurality of guided portions are a plurality of track links 25b.

The crawler belt 25 is formed by interconnecting the plurality of track shoes 25a by the plurality of track links 25b. The belt body of the crawler belt 25 has an annular shape in side view and a band shape in plan view. Each of the track links 25b is attached to the inner surface of a respective one of the track shoes 25a. Though not shown in detail in FIG. 4, each track link 25b includes a pair of link plates, a pin and a bushing, for example. The track links 25b each attached to adjacent track shoes 25a are connected to each other to interconnect the adjacent track shoes 25a. Such interconnection of the plurality of track shoes 25a forms the crawler belt 25 in a continuous loop (in an endless form). The crawler belt 25 is wound around the drive wheel 24 and the idler wheel 23 attached to the front end portion and the rear end portion of the crawler frame 22. The drive wheel 24 is driven to circulate (rotate) the crawler belt 25.

The plurality of upper guide rollers 26 are each rotatably supported on an upper part of a middle portion of the crawler frame 22 (the middle portion is a portion between the front end portion and the rear end portion to which the idler wheel 23 and the drive wheel 24 are attached). The upper guide rollers 26 are spaced from one another in the front-and-rear direction. The plurality of lower guide rollers 27 are each rotatably supported on a lower part of the middle portion of the crawler frame 22. The lower guide rollers 27 are spaced from one another in the front-and-rear direction.

Each of the upper guide rollers 26 has a rotational axis and each of the lower guide rollers 27 has a rotational axis J (see FIG. 2) that extend in the left-and-right direction orthogonal to a rotational direction of the crawler belt 25. Each of the upper guide rollers 26 is rotatable about the corresponding rotational axis and each of the lower guide rollers 27 is rotatable about the corresponding rotational axis J. Each of the upper guide rollers 26 and each of the lower guide rollers 27 has a shape engageable with the track link 25b (see FIG. 4). This allows each of the upper guide rollers 26 and each of the lower guide rollers 27 to guide the crawler belt 25 in a circular motion around the idler wheel 23 and the drive wheel 24.

[Track Guide Before Improvement]

As mentioned above, each of the pair of crawler track units 21, 21 includes at least one track guide 30. Each track guide 30 is disposed to enclose any predetermined one of the lower guide rollers 27. The track guide 30 is provided for restraining the crawler belt 25 from displacement in the left-and-right direction (lateral displacement of the crawler belt 25) with respect to the crawler frame 22.

Figure 2:
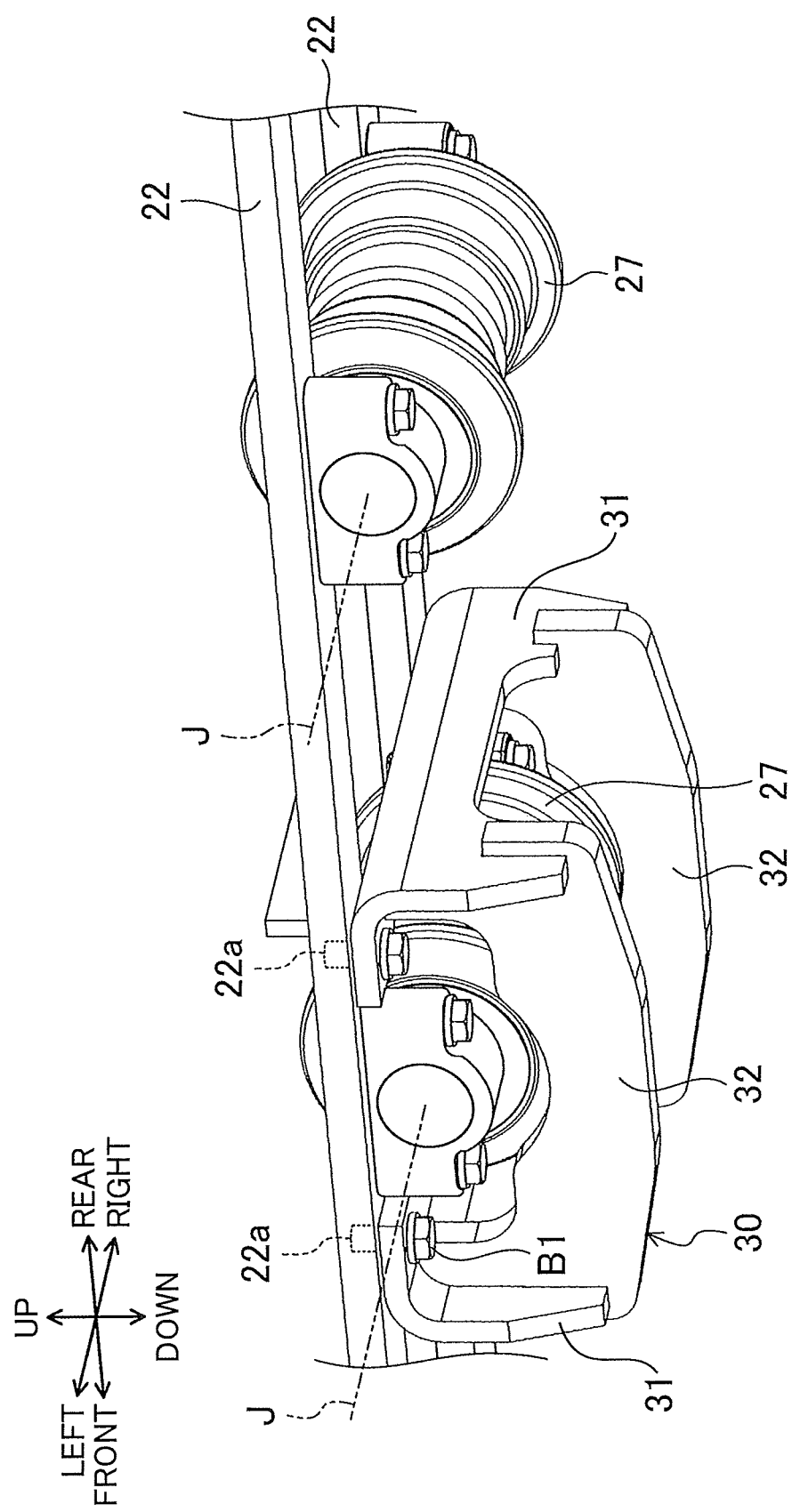
FIG. 2 is a schematic enlarged perspective view of a portion encircled by a two-dot chain line R in FIG. 1.
Figure 3:
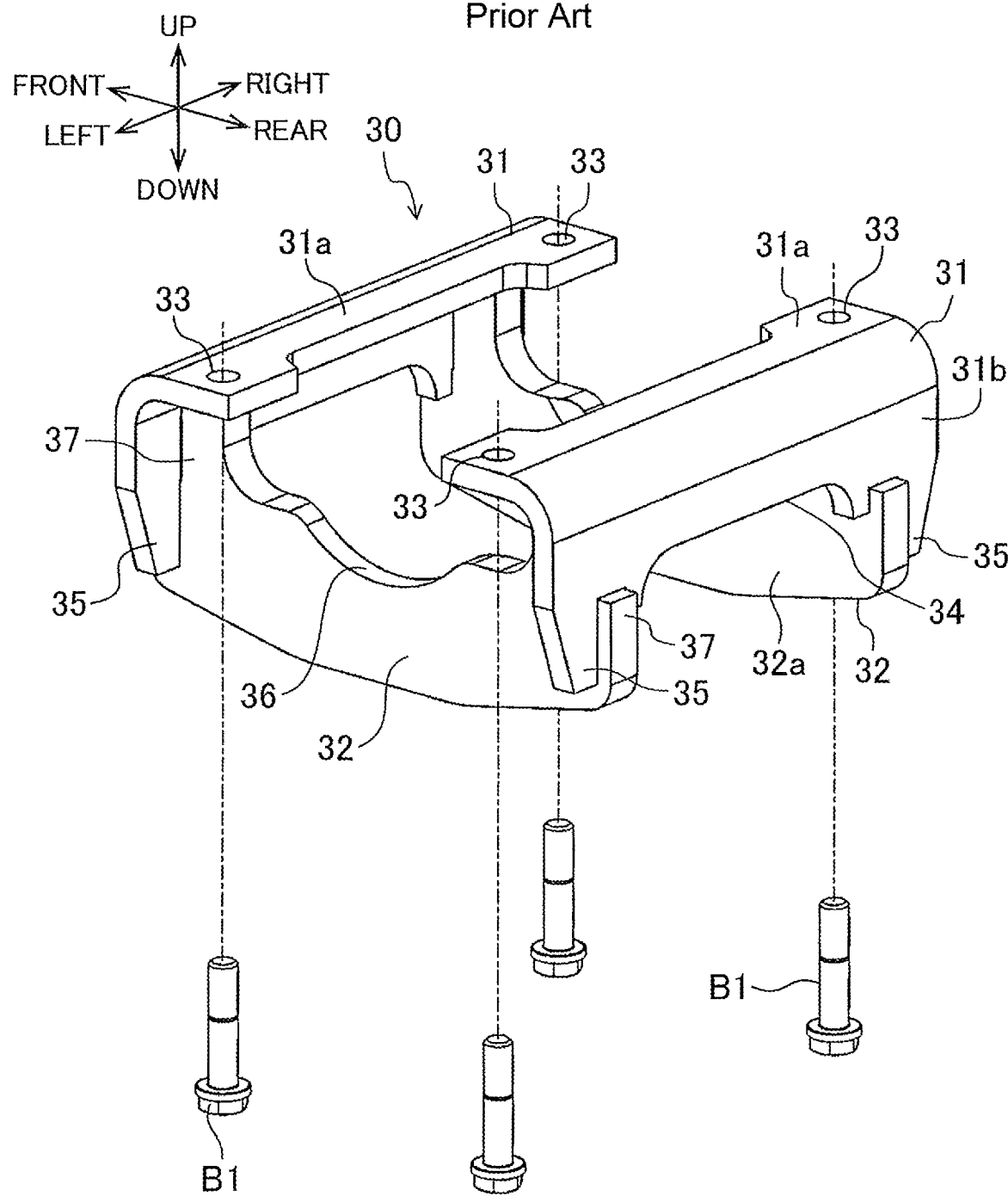
FIG. 3 is a schematic perspective view of a track guide before an improvement.

FIGS. 2 and 3 specifically illustrate a track guide 30 before an improvement (before the disclosed technique is applied thereto). The track guide 30 includes a pair of attachment members 31, 31 and a pair of contact plate members 32, 32. These components are integrated, for example, by welding. The pair of attachment members 31, 31 includes a front attachment member 31 and a rear attachment member 31. The pair of contact plate members 32, 32 includes a right contact plate member 32 and a left contact plate member 32.

The front attachment member 31 is disposed in front of the lower guide roller 27 and extends along the rotational axis J of the lower guide roller 27, the front attachment member 31 being detachably attached to the crawler frame 22. The rear attachment member 31 is disposed behind the lower guide roller 27 and extends along the rotational axis J of the lower guide roller 27, the rear attachment member 31 being detachably attached to the crawler frame 22.

Each of the pair of attachment members 31, 31 is in the form of a laterally long member formed by bending a metal plate (e.g. a thick metal plate). Each attachment member 31 includes a flange portion 31a in the form of a band-shaped plate and a support plate portion 31b extending upright from one side of the flange portion 31a. The support plate portion 31b extends in a direction orthogonal to the direction of extension of the flange portion 31a.

When each attachment member 31 is mounted on the crawler track unit 21, the flange portion 31a of the attachment member 31 extends in the left-and-right direction and the support plate portion 31b of the attachment member 31 projects downward from the flange portion 31a to the right contact plate member 32 and the left contact plate member 32. Specifically, the flange portion 31a of the front attachment member 31 projects rearward from an upper part of the support plate portion 31b of the front attachment member 31, and the flange portion 31a of the rear attachment member 31 projects frontward from an upper part of the support plate portion 31b of the rear attachment member 31.

The flange portion 31a has a pair of through-holes 33, 33 passing therethrough in the up-and-down direction. The paired through-holes 33, 33 are formed at opposite end portions of the flange portion 31a in the left-and-right direction. Specifically, the pair of through-holes 33, 33 includes a right through-hole 33 located at the right side of the right contact plate member 32 in plan view and a left through-hole 33 located at the left side of the left contact plate member 32 in plan view. In each of the pair of through-holes 33, 33, a fixing bolt B1 (an example of a fastening member) is inserted to attach the flange portion 31a to the crawler frame 22.

The support plate portion 31b includes a pair of abutment sections 35, 35 and a middle section extending between the abutment sections 35, 35. The pair of abutment sections 35, 35 includes a right abutment section 35 extending upward from the right contact plate member 32 to a right end portion of the flange portion 31a and a left abutment section 35 extending upward from the left contact plate member 32 to a left end portion of the flange portion 31a. The middle section of the support plate portion 31b has a lower surface (lower edge) located above respective lower surfaces of the paired abutment sections 35, 35. The middle section of the support plate portion 31b has a recess 34 (lower recess 34) for avoiding contact with the track link 25b. The recess 34 is defined by the lower surface (lower edge) of the middle section recessed upward to lie above the respective lower surfaces of the paired abutment sections 35, 35. Consequently, the paired abutment sections 35, 35 constituting the opposite end portions of the support plate portion 31b in the left-and-right direction project downward relative to the middle section.

Each of the pair of contact plate members 32 is in the form of a metal plate (e.g. a thick metal plate) having a longer dimension in the front-and-rear direction. Each contact plate member 32 includes a pair of abutment portions 37, 37 and a middle portion extending between the abutment portions 37, 37. The paired abutment portions 37, 37 constitute a front end portion and a rear end portion of the contact plate member 32. The middle portion of the contact plate member 32 has an upper surface located below respective upper surfaces of the paired abutment portions 37, 37. Thus, the paired abutment portions 37, 37 constituting the opposite end portions of the contact plate member 32 in the front-and-rear direction project upward relative to the middle portion. The middle portion of the contact plate member 32 has a recess 36 (upper recess 36) for avoiding contact with the lower guide roller 27. The recess 36 is defined by at least part of the upper surface (upper edge) of the middle portion that is recessed downward.

Each of the pair of contact plate members 32, 32 is laid between the paired attachment members 31, 31 and joined to the pair of attachment members 31, 31, for example, by welding.

Specifically, the paired attachment members 31, 31 are disposed such that the respective flange portions 31a, 31a extend from the support plate portions 31b, 31b in directions toward each other and, at the same time, extend in parallel to each other at a predetermined distance from each other in the front-and-rear direction. Such arrangement of the flange portions 31a, 31a makes it possible to reduce the space required to attach the track guide 30 (reduce the dimension of the track guide 30 in the front-and-rear direction). Furthermore, since the front and rear flange portions 31a, 31a are disposed at the inner sides of the front and rear support plate portions 31b, 31b in the front-and-rear direction, the flange portions 31a, 31a are protected by the support plate portions 31b, 31b (it is possible to reduce the frequency of collision of a rock or stone approaching from outside the track guide 30 with the flange portion 31*a*). The paired contact plate members 32, 32 are disposed at a predetermined distance from each other in the left-and-right direction such that they extend in a direction orthogonal to the pair of attachment members 31, 31. The paired contact plate members 32, 32 are disposed between the pair of through-holes 33, 33 of each attachment member 31 in plan view.

In the above-described state of arrangement, each abutment portion 37 is welded to a lower end portion of the abutment section 35 adjacent thereto. Consequently, each of the pair of contact plate members 32, 32 is laid between the paired attachment members 31, 31. The integration of the attachment members 31, 31 and the contact plate members 32, 32 allows the track guide 30 to have a frame-like shape with a rectangular shape in plan view.

As shown in FIG. 2, the track guide 30 is attached to the crawler frame 22 in such a way as to enclose the predetermined one of the plurality of lower guide rollers 27. Specifically, a portion of the crawler frame 22 where the lower guide roller 27 is disposed is formed with a plurality of fixing holes 22*a* (specifically, four fixing holes 22*a*) corresponding to the plurality of through-holes 33 (specifically, the two right through-holes and the two left through-holes).

As shown in FIGS. 2 and 3, the plurality of fixing bolts B1 respectively passing through the plurality of through-holes 33 are tightened into respective ones of the fixing holes 22*a*, whereby the track guide 30 is detachably attached to the crawler frame 22. Consequently, the paired attachment members 31, 31 are located in front of and behind the lower guide roller 27, extending along the rotational axis J of the lower guide roller 27. The right contact plate member 32 is located under a right end portion of the lower guide roller 27 (specifically, a right end portion of a shaft of the lower guide roller 27) and extends in the front-and-rear direction at the position facing the right end portion in the up-and-down direction. Similarly, the left contact plate member 32 is located under a left end portion of the lower guide roller 27 (specifically, a left end portion of the shaft of the lower guide roller 27) and extends in the front-and-rear direction at the position facing the left end portion in the up-and-down direction.

As shown in FIG. 4, the track link 25*b* is configured to allow an upper part thereof to come into contact with a lower part of the lower guide roller 27 to be guided by the lower guide roller 27. The track link 25*b* is configured to be located between the paired contact plate members 32, 32 with a predetermined gap G left between the track link 25*b* and each of the contact plate members 32, 32. This allows a facing surface (restraint surface 32*a*) of each of the contact plate members 32, 32 to come into contact with an end portion of the track link 25*b* when the track link 25*b* is laterally displaced to a predetermined extent or more, thereby making it possible to prevent disengagement of the crawler belt 25.

The contact plate member 32 is therefore liable to be worn by the contact with the track link 25*b*. Thus, the track guide 30 is a consumable product that requires replacement when it gets worn out. However, the track guide 30 is heavy (some models weigh 30 kg or more). Furthermore, since the track guide 30 is disposed on the lower part of the crawler frame 22, it is difficult to be detached and attached. This makes the detachment and attachment (the replacement work) of the track guide 30 troublesome.

In addition, the track link 25*b* is also liable to be worn by the contact with the track guide 30. Moreover, the track link 25*b* tends to be more easily worn than the track guide 30. The work of replacing the track link 25*b* includes detaching the crawler belt 25 from the crawler frame 22 and dismantling it, which is therefore more troublesome than the work of replacing the track guide 30. Furthermore, the cost required to replace the track link 25*b* is higher than the cost required to replace the track guide 30.

Accordingly, it is desired to suppress the wear of both the track guide 30 and the track link 25*b*. As a measure to achieve this object, it can be considered to increase the gap G between the track link 25*b* and the contact plate member 32 within a range capable of preventing the disengagement of the crawler belt 25, to thereby make it difficult for them to come into contact with each other. However, increasing the gap G between the track link 25*b* and the contact plate member 32 would locate each contact plate member 32 at a position closer to respective edges of the attachment members 31 (respective edges of the flange portions 31*a*). This would make it difficult to attach the track guide 30 to the crawler frame 22.

Specifically, each through-hole 33 allowing the fixing bolt B1 to be tightened to the crawler frame 22 to pass therethrough is located at the outer side of the contact plate member 32 in the left-and-right direction. In other words, each through-hole 33 is located between the edge of the flange portion 31*a* and the contact plate member 32 in the left-and-right direction. Therefore, the above-mentioned measure would reduce the distance between the contact plate member 32 and the through-hole 33, which may cause, for example, a tool for tightening the fixing bolt B1 to come into contact with the contact plate member 32. If the through-hole 33 is formed at a position closer to the edge of the flange portion 31*a* to avoid the contact, it will be difficult to ensure the strength of the tightened part due to such structure. The plate thickness of the contact plate member 32 is determined in consideration of the required strength. Therefore, making the contact plate member 32 thinner may result in large deformation of the contact plate member 32.

For the reasons stated above, the above-described track guide 30 before the improvement has structural limitations for increasing the gap G between the track link 25*b* and the contact plate member 32. Accordingly, it is desired to find ways to effectively suppress the wear of both the track guide 30 and the track link 25*b*.

The technique specifically disclosed below provides an improved track guide 30 in order to effectively suppress the wear of both the track guide 30 and the track link 25*b*, thereby making it possible to increase the gap G between the track link 25*b* and the contact plate member 32.

[Improved Track Guide]

Figure 5:
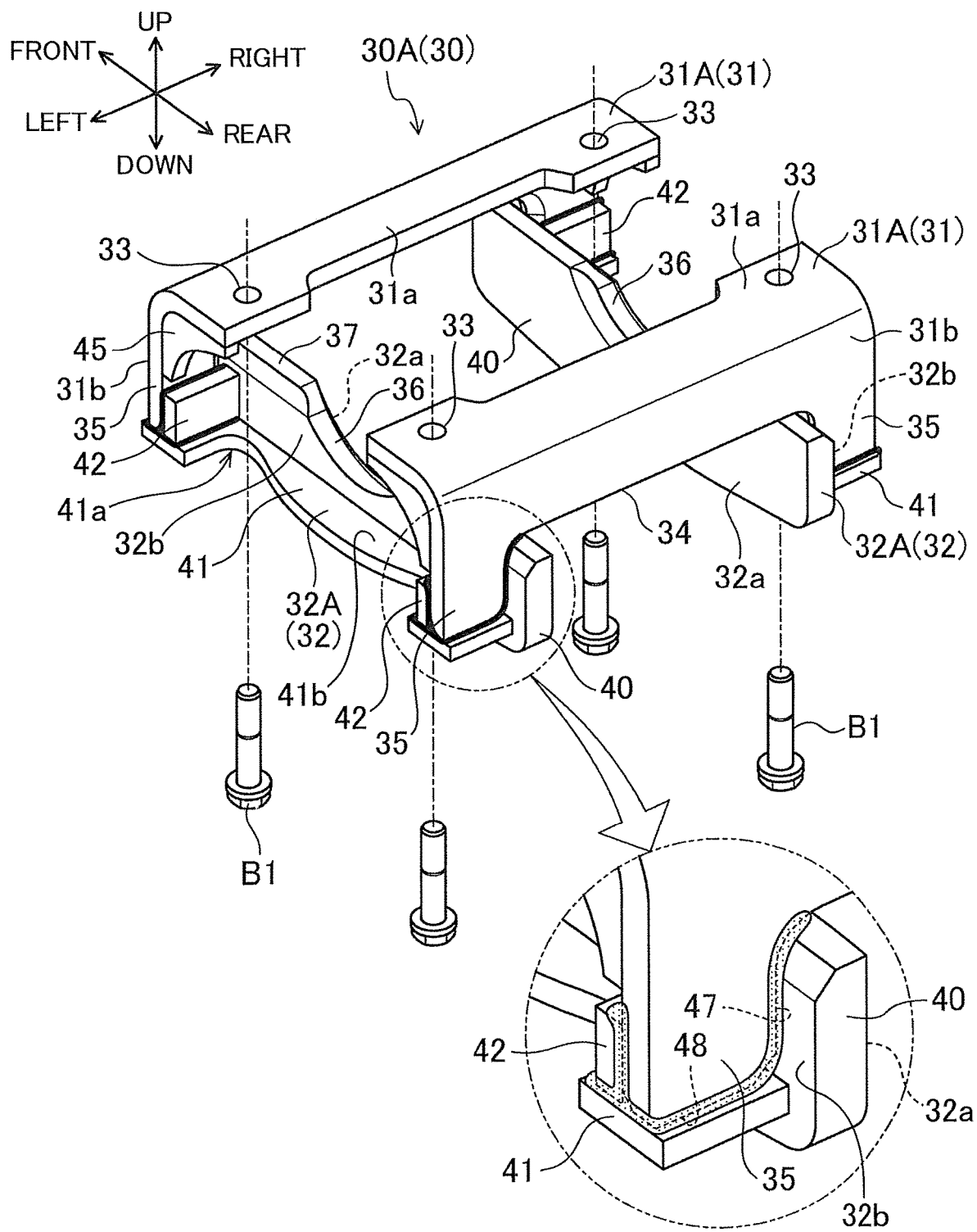
FIG. 5 is a schematic perspective view of an example of a track guide embodying the disclosed technique (an improved track guide).

FIG. 5 is a perspective view of an improved track guide 30A serving as an example of the improved track guide (an example of the track guide embodying the disclosed technique). The improved track guide 30A has the same basic structure as the track guide 30 described above with reference to FIGS. 2 to 4, and the improved track guide 30A can be mounted on a working machine of the same type as the hydraulic excavator 1 described above with reference to FIG. 1. Therefore, the structural components of the improved track guide 30A common with the track guide 30 will be denoted by the same respective reference numerals as in FIGS. 2 to 4 in FIG. 5 and the succeeding drawings, and the detailed descriptions thereof will be omitted. Hereinafter, the improved track guide 30A will be simply referred to as "track guide 30A".

The track guide 30A shown in FIG. 5 includes a pair of attachment members 31A, 31A and a pair of contact plate members 32A, 32A. The pair of attachment members 31A, 31A (the pair of improved attachment members 31A, 31A)

has improved features over the pair of attachment members 31, 31 shown in FIGS. 2 to 4, and the pair of contact plate members 32A, 32A has improved features over the pair of contact plate members 32, 32 shown in FIGS. 2 to 4. Hereinafter, the improved attachment member 31A will be simply referred to as "attachment member 31A" and the improved contact plate member 32A will be simply referred to as "contact plate member 32A".

As shown in FIG. 5, the pair of attachment members 31A, 31A includes a front attachment member 31A and a rear attachment member 31A, and the pair of contact plate members 32A, 32A includes a right contact plate member 32A and a left contact plate member 32A. The right contact plate member 32A is laid between a right end portion of the front attachment member 31A and a right end portion of the rear attachment member 31A. The left contact plate member 32A is laid between a left end portion of the front attachment member 31A and a left end portion of the rear attachment member 31A.

Figure 6:
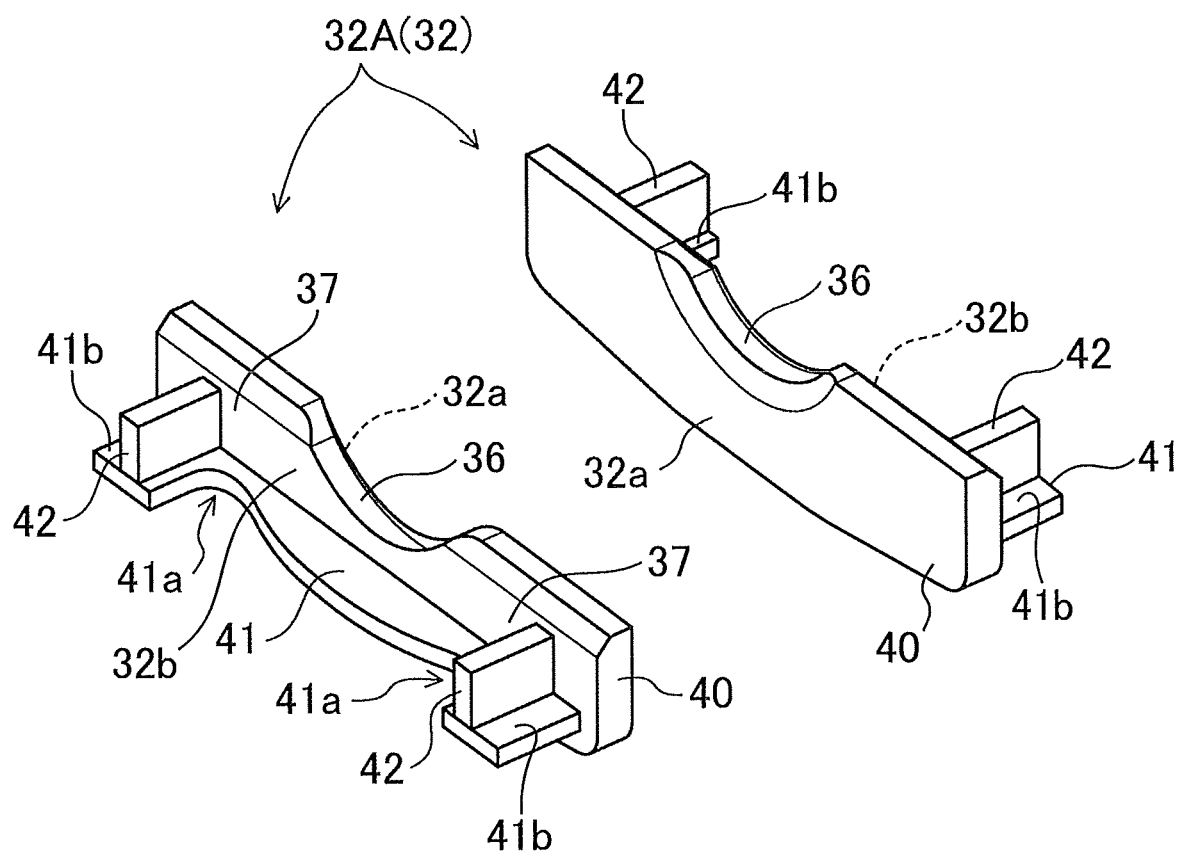
FIG. 6 is a schematic perspective view of contact plate members that have been improved (improved contact plate members).
Figure 6:
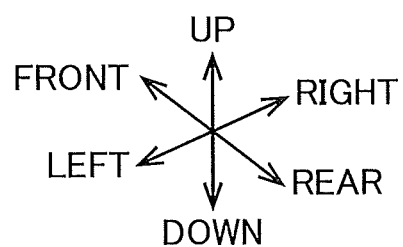

As shown in FIGS. 5 and 6, each of the pair of contact plate members 32A, 32A includes a restraint plate 40, a reinforcement plate 41, and a pair of rib plates 42, 42.

Each restraint plate 40 is in the form of a metal band-shaped plate that is narrower and longer in the front-and-rear direction (extending in the front-and-rear direction). The restraint plate 40 has a plate thickness (a thickness in the left-and-right direction) less than that of each of the above-described pair of contact plate members 32, 32 shown in FIGS. 2 to 4.

Each restraint plate 40 has a front end portion, a rear end portion and a middle portion extending between the front end portion and the rear end portion. The front end portion of the restraint plate 40 of the right contact plate member 32A has a section configured to come into surface contact with a right abutment section 35 of the front attachment member 31A, and the rear end portion of the restraint plate 40 of the right contact plate member 32A has a section configured to come into surface contact with a right abutment section 35 of the rear attachment member 31A. The front end portion of the restraint plate 40 of the left contact plate member 32A has a section configured to come into surface contact with a left abutment section 35 of the front attachment member 31A, and the rear end portion of the restraint plate 40 of the left contact plate member 32A has a section configured to come into surface contact with a left abutment section 35 of the rear attachment member 31A.

The middle portion of each restraint plate 40 has a recess 36 (upper recess 36) for avoiding contact with the lower guide roller 27. The recess 36 is defined by at least part of an upper surface (upper edge) of the middle portion that is recessed downward.

The restraint plate 40 of each the right contact plate member 32A and the left contact plate member 32A has an inner surface 32a and an outer surface 32b.

Specifically, as shown in FIGS. 5 and 6, the inner surface 32a of the restraint plate 40 of the right contact plate member 32A defines an inner surface of the track guide 30A facing inward in the left-and-right direction, i.e. facing left, and the inner surface 32a of the restraint plate 40 of the left contact plate member 32A defines an inner surface of the track guide 30A facing inward in the left-and-right direction, i.e. facing right. As shown in FIG. 4, the inner surfaces 32a, 32a are disposed opposite each other across the track link 25b (specifically, an upper part of the track link 25b) in the left-and-right direction.

The inner surface 32a of the restraint plate 40 of the right contact plate member 32A serves as a restraint surface 32a for, when the track link 25b has come into contact therewith due to rightward displacement of the crawler belt 25, stopping the rightward motion of the track link 25b to thereby restrain the track link 25b from rightward displacement. Similarly, the inner surface 32a of the restraint plate 40 of the left contact plate member 32A serves as a restraint surface 32a for, when the track link 25b has come into contact therewith due to leftward displacement of the crawler belt 25, stopping the leftward motion of the track link 25b to thereby restrain the track link 25b from leftward displacement.

As shown in FIGS. 5 and 6, the outer surface 32b of the restraint plate 40 of the right contact plate member 32A defines an outer surface of the track guide 30A facing outward in the left-and-right direction, i.e. facing right, and the outer surface 32b of the restraint plate 40 of the left contact plate member 32A defines an outer surface of the track guide 30A facing outward in the left-and-right direction, i.e. facing left. The outer surface 32b of each restraint plate 40 is located on the opposite side of the restraint plate 40 from the inner surface 32a.

The reinforcement plate 41 of each of the pair of contact plate members 32A, 32A is in the form of a metal band-shaped plate that is narrower and longer in the front-and-rear direction (extending in the front-and-rear direction). In the present embodiment, the reinforcement plate 41 has a plate thickness (a thickness in the up-and-down direction) less than that of each of the above-described pair of contact plate members 32, 32 shown in FIGS. 2 to 4. However, the plate thickness of the reinforcement plate 41 may be equal to or greater than that of each of the pair of contact plate members 32, 32.

Each reinforcement plate 41 projects outward in the left-and-right direction from the outer surface 32b of the corresponding restraint plate 40. Specifically, the reinforcement plate 41 of the right contact plate member 32A projects outward in the left-and-right direction, i.e. rightward, from the outer surface 32b of the restraint plate 40 of the right contact plate member 32A, and the reinforcement plate 41 of the left contact plate member 32A projects outward in the left-and-right direction, i.e. leftward, from the outer surface 32b of the restraint plate 40 of the left contact plate member 32A.

In the present embodiment, each reinforcement plate 41 is disposed in a position extending in a direction substantially orthogonal to the outer surface 32b of the restraint plate 40. However, each angle between the reinforcement plate 41 and the outer surface 32b of the restraint plate 40 may not necessarily be the substantially right angle, but may an obtuse angle or an acute angle.

Further, in the present embodiment, each reinforcement plate 41 is connected to a lower part of the restraint plate 40 and extends in the front-and-rear direction along the restraint plate 40.

Each reinforcement plate 41 has an upper surface 41b. In the present embodiment, the upper surface 41b of each reinforcement plate 41 is a flat surface extending in a direction substantially orthogonal to the outer surface 32b of the restraint plate 40; however, the upper surface 41b is not limited to such a surface. It may be a flat surface or a curved surface extending at an obtuse angle or an acute angle with respect to the outer surface 32b of the restraint plate 40.

Each reinforcement plate 41 may be made to project outward in the left-and-right direction from the outer surface 32b of the restraint plate 40 by connecting a left or right surface thereof to the outer surface 32b. Alternatively, each reinforcement plate 41 may be made to project outward in the left-and-right direction from the outer surface 32b by connecting the upper surface 41b thereof to a lower surface of the restraint plate 40.

Further, in the present embodiment, each reinforcement plate 41 is secured to the restraint plate 40 by welding. However, the method of securing the reinforcement plate 41 to the restraint plate 40 is not limited to welding.

In the present embodiment, the rigidity of the restraint plate 40 is structurally reinforced with the above-described reinforcement plate 41. This allows the restraint plate 40, having a smaller plate thickness than the contact plate member 32 shown in FIGS. 2 to 4, to have a rigidity sufficient to withstand a great load applied by the track link 25b of the crawler belt 25 to the restraint surface 32a of the restraint plate 40. This makes it possible to increase a gap G (see FIG. 4) between the track link 25b and the inner surface 32a of each restraint plate 40. In addition, this makes it possible to reduce the weight of the track guide 30A.

Figure 8:
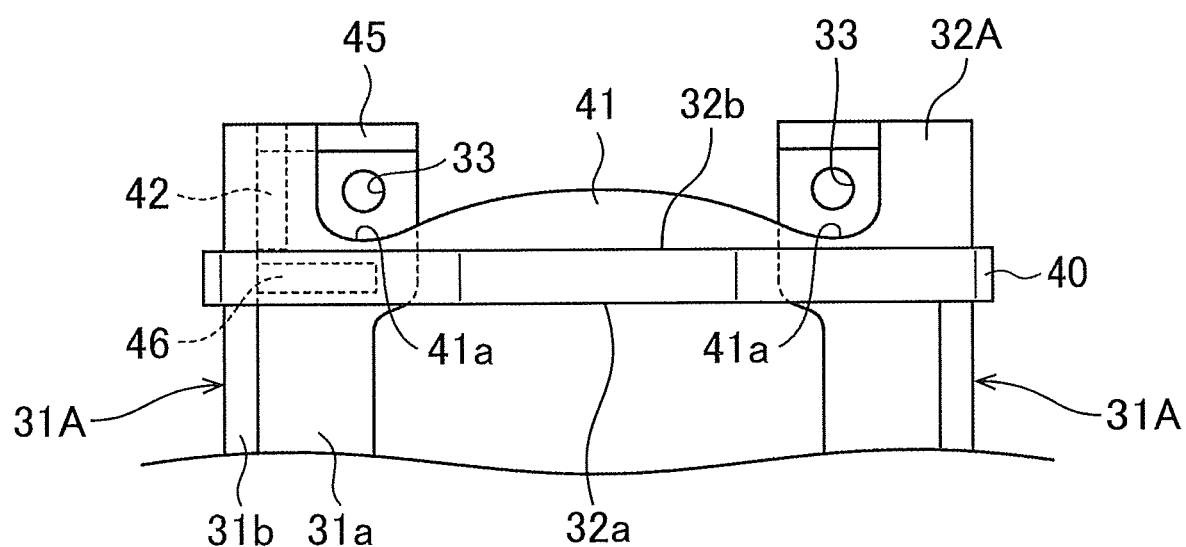
FIG. 8 is a schematic view of an essential part of the track guide as viewed from below for explaining a relationship between a reinforcement plate and through-holes.

The reinforcement plate 41 of each of the pair of contact plate members 32A, 32A has a pair of recesses 41a, 41a. Specifically, as shown in FIGS. 5, 6, and 8, the pair of recesses 41a, 41a formed in the reinforcement plate 41 of the right contact plate member 32A is defined by a right surface of the reinforcement plate 41 recessed leftward at positions that correspond to a right through-hole 33 of the front attachment member 31A and a right through-hole 33 of the rear attachment member 31A in plan view so that the reinforcement plate 41 does not overlap these right through-holes 33, 33 in plan view. The reinforcement plate 41 avoids overlapping these right through-holes 33, 33 in plan view. The pair of recesses 41a, 41a formed in the reinforcement plate 41 of the left contact plate member 32A is defined by a left surface of the reinforcement plate 41 recessed rightward at positions that correspond to a left through-hole 33 of the front attachment member 31A and a left through-hole 33 of the rear attachment member 31A in plan view so that the reinforcement plate 41 does not overlap these left through-holes 33, 33 in plan view. The reinforcement plate 41 avoids overlapping these left through-holes 33, 33 in plan view.

Each rib plate 42 is in the form of a metal plate having, for example, a rectangular shape, and smaller than the restraint plate 40 and the reinforcement plate 41. In the present embodiment, each rib plate 42 is disposed in a position extending in a direction substantially orthogonal to both the restraint plate 40 and the reinforcement plate 41.

The pair of rib plates 42, 42 of the right contact plate member 32A includes a front rib plate 42 connected to the front end portion of the restraint plate 40 and a front end portion of the reinforcement plate 41, and a rear rib plate 42 connected to the rear end portion of the restraint plate 40 and a rear end portion of the reinforcement plate 41. Each rib plate 42 is disposed adjacent to the outer surface 32b of the restraint plate 40 and the upper surface 41b of the reinforcement plate 41 and has end surfaces in contact with the outer surface 32b of the restraint plate 40 and the upper surface 41b of the reinforcement plate 41. These end surfaces are welded to the outer surface 32b of the restraint plate 40 and the upper surface 41b of the reinforcement plate 41, whereby each rib plate 42 is secured to both the restraint plate 40 and the reinforcement plate 41. However, the method of securing the rib plate 42 to the restraint plate 40 and the reinforcement plate 41 is not limited to welding.

In the present embodiment, the rigidity of the restraint plate 40 is further structurally reinforced with the rib plates 42, 42. This makes it possible to further reduce the plate thickness of the restraint plate 40. This in turn makes it possible to further increase the gap G between the track link 25b and the inner surface 32a of each restraint plate 40. Furthermore, this makes it possible to further reduce the weight of the track guide 30A.

Figure 7:
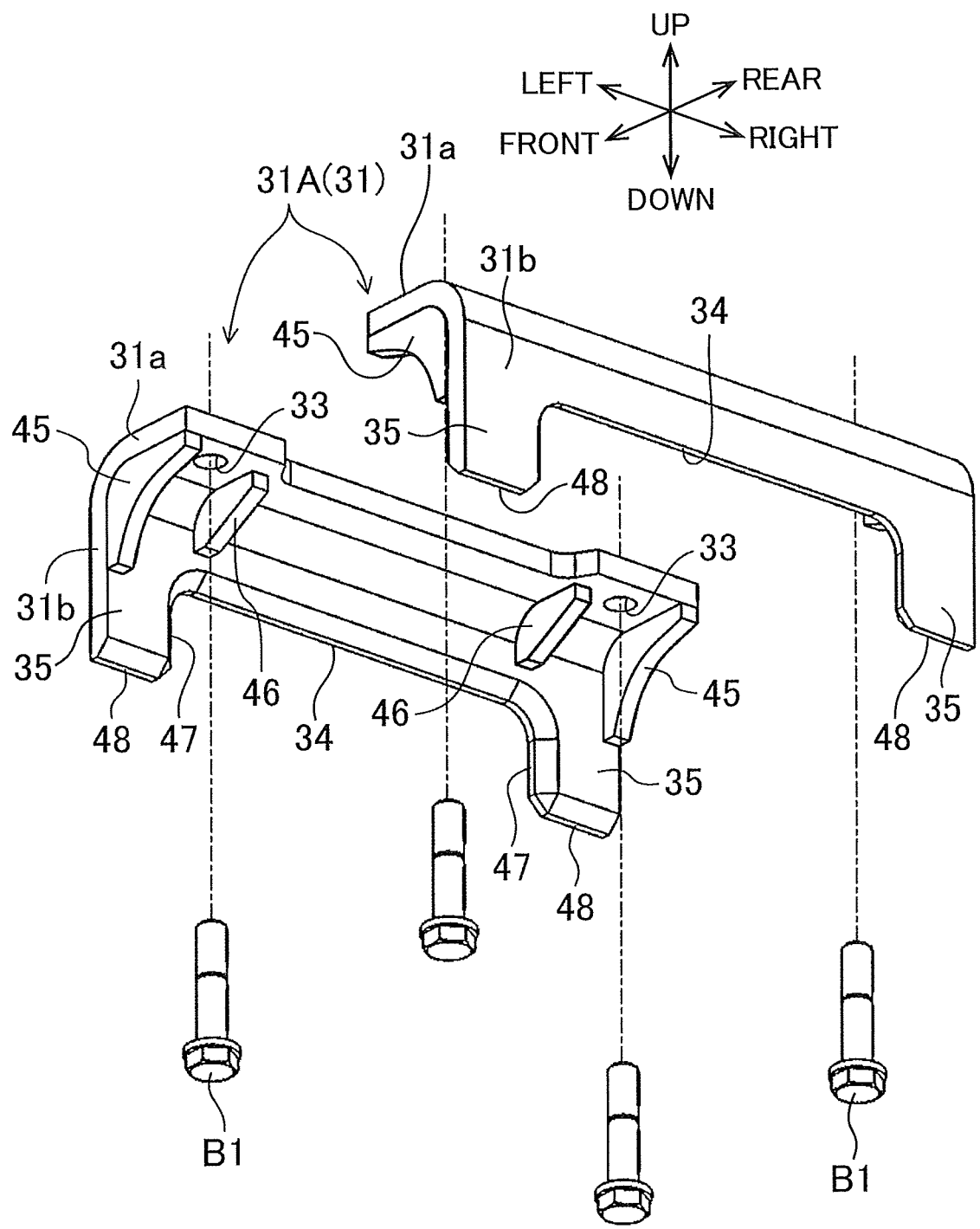
FIG. 7 is a schematic perspective view of attachment members that have been improved (improved attachment members).

As shown in FIG. 7, each of the pair of attachment members 31A, 31A further includes a pair of outer ribs 45, 45.

Specifically, the pair of outer ribs 45, 45 of the front attachment member 31A includes a right outer rib 45 and a left outer rib 45. The right outer rib 45 is disposed at the right end portion of the front attachment member 31A and connected to a rear surface (surface facing rearward) of a support plate portion 31b and a lower surface (a surface facing downward) of a flange portion 31a of the front attachment member 31A. The left outer rib 45 is disposed at the left end portion of the front attachment member 31A and connected to the rear surface of the support plate portion 31b and the lower surface of the flange portion 31a of the front attachment member 31A. The pair of outer ribs 45, 45 of the rear attachment member 31A includes a right outer rib 45 and a left outer rib 45. The right outer rib 45 is disposed at the right end portion of the rear attachment member 31A and connected to a front surface (surface facing frontward) of a support plate portion 31b and a lower surface (a surface facing downward) of a flange portion 31a of the rear attachment member 31A. The left outer rib 45 is disposed at a left end portion of the rear attachment member 31A and connected to the front surface of the support plate portion 31b and the lower surface of the flange portion 31a of the rear attachment member 31A.

The right outer rib 45 of the front attachment member 31A is located at the right side of the right through-hole 33 of the flange portion 31a and the left outer rib 45 of the front attachment member 31A is located at the left side of the left through-hole 33 of the flange portion 31a. Similarly, the right outer rib 45 of the rear attachment member 31A is located at the right side of the right through-hole 33 of the flange portion 31a and the left outer rib 45 of the rear attachment member 31A is located at the left side of the left through-hole 33 of the flange portion 31a.

In the present embodiment, as shown in FIG. 7, the boundary area in the front attachment member 31A between the rear surface of the support plate portion 31b and the lower surface of the flange portion 31a is in the form of a curved surface, and each of the outer ribs 45, 45 is disposed in such a way as to cover part of the boundary area (curved surface). Similarly, the boundary area in the rear attachment member 31A between the front surface of the support plate portion 31b and the lower surface of the flange portion 31a is in the form of a curved surface, and each of the outer ribs 45, 45 is disposed in such a way as to cover part of the boundary area (curved surface).

Further, in the present embodiment, as shown in FIG. 7, each outer rib 45 has a substantially L-shape in side view extending between the support plate portion 31b and the flange portion 31a. However, the shape of each outer rib 45 is not limited to the specific example shown in FIG. 7.

Each outer rib 45 has end surfaces welded to the rear surface or the front surface of the support plate portion 31b and the lower surface of the flange portion 31a, whereby the outer rib 45 is secured to both the support plate portion 31b and the flange portion 31a. However, the method of securing each outer rib 45 to the support plate portion 31b and the flange portion 31a is not limited to welding.

In the present embodiment, the rigidity of each of the pair of attachment members 31A, 31A is structurally reinforced with the pair of outer ribs 45, 45. This makes it possible to reduce the plate thickness of each of the pair of attachment members 31A, 31A and, in turn, reduce the weight of the track guide 30A.

As shown in FIG. 7, each of the pair of attachment members 31A, 31A further includes a pair of inner ribs 46, 46. The paired inner ribs 46, 46 are disposed between the paired through holes 33, 33 in the left-and-right direction.

Specifically, the pair of inner ribs 46, 46 of the front attachment member 31A includes a right inner rib 46 and a left inner rib 46. The right inner rib 46 is disposed at the right end portion of the front attachment member 31A and connected to the rear surface of the support plate portion 31b and the lower surface of the flange portion 31a of the front attachment member 31A. The left inner rib 46 is disposed at the left end portion of the front attachment member 31A and connected to the rear surface of the support plate portion 31b and the lower surface of the flange portion 31a of the front attachment member 31A. The pair of inner ribs 46, 46 of the rear attachment member 31A includes a right inner rib 46 and a left inner rib 46. The right inner rib 46 is disposed at the right end portion of the rear attachment member 31A and connected to the front surface of the support plate portion 31b and the lower surface of the flange portion 31a of the rear attachment member 31A. The left inner rib 46 is disposed at the left end portion of the rear attachment member 31A and connected to the front surface of the support plate portion 31b and the lower surface of the flange portion 31a of the rear attachment member 31A.

The right inner rib 46 of the front attachment member 31A is located at the left side of the right through-hole 33 of the flange portion 31a and the left inner rib 46 of the front attachment member 31A is located at the right side of the left through-hole 33 of the flange portion 31a. Similarly, the right inner rib 46 of the rear attachment member 31A is located at the left side of the right through-hole 33 of the flange portion 31a and the left inner rib 46 of the rear attachment member 31A is located at the right side of the left through-hole 33 of the flange portion 31a.

In the present embodiment, as shown in FIG. 7, each inner rib 46 has a substantially L-shape in side view extending between the support plate portion 31b and the flange portion 31a. However, the shape of each inner rib 46 is not limited to the specific example shown in FIG. 7.

In the present embodiment, as shown in FIG. 7, each of the pair of inner ribs 46, 46 in the front attachment member 31A is disposed in such a way as to cover part of the above-mentioned boundary area (curved surface), and each of the pair of inner ribs 46, 46 in the rear attachment member 31A is disposed in such a way as to cover part of the above-mentioned boundary area (curved surface).

In the present embodiment, the rigidity of each of the pair of attachment members 31A, 31A is further structurally reinforced with the pair of inner ribs 46, 46. This makes it possible to reduce the plate thickness of each of the pair of attachment members 31A, 31A and, in turn, further reduce the weight of the track guide 30A.

Similarly to the pair of attachment members 31, 31 shown in FIGS. 2 to 4, each of the pair of attachment members 31A, 31A shown in FIGS. 5 and 7 includes a pair of abutment sections 35, 35 and a middle section extending between the abutment sections 35, 35. The pair of abutment sections 35, 35 includes a right abutment section 35 and a left abutment section 35. The right abutment section 35 extends upward from the reinforcement plate 41 of the right contact plate member 32 to the right end portion of the flange portion 31a. The left abutment section 35 extends upward from the reinforcement plate 41 of the left contact plate member 32 to the left end portion of the flange portion 31a. The middle section of the support plate portion 31b has a lower surface (lower edge) located above respective lower surfaces (later-described end surfaces 48) of the paired abutment sections 35, 35. The middle section of the support plate portion 31b has a recess 34 (lower recess 34) for avoiding contact with the track link 25b. The recess 34 is defined by the lower surface (lower edge) of the middle section recessed upward to lie above the respective lower surfaces of the paired abutment sections 35, 35.

As shown in FIGS. 5 and 7, each of the pair of abutment sections 35, 35 has an abutting side surface 47 that is a side surface disposed adjacent to the outer surface 32b of the restraint plate 40 in the left-and-right direction and an abutting end surface 48 that is the lower surface disposed adjacent to the upper surface 41b of the reinforcement plate 41. The abutting side surface 47 extends in parallel to the portion of the outer surface 32b of the restraint plate 40 that is disposed adjacent to the abutting side surface 47. The abutting end surface 48 extends in parallel to the portion of the upper surface 41b of the reinforcement plate 41 that is disposed adjacent to the abutting end surface 48. In the present embodiment, the abutting side surface 47 and the abutting end surface 48 are in the form of two continuous surfaces substantially perpendicular to each other.

Specifically, the abutting side surface 47 of the right abutment section 35 of the front attachment member 31A is in surface contact with a front end portion of the outer surface 32b of the restraint plate 40 of the right contact plate member 32A, and the abutting end surface 48 of the right abutment section 35 of the front attachment member 31A is in surface contact with a front end portion of the upper surface 41b of the reinforcement plate 41 of the right contact plate member 32A. The abutting side surface 47 of the left abutment section 35 of the front attachment member 31A is in surface contact with a front end portion of the outer surface 32b of the restraint plate 40 of the left contact plate member 32A, and the abutting end surface 48 of the left abutment section 35 of the front attachment member 31A is in surface contact with a front end portion of the upper surface 41b of the reinforcement plate 41 of the left contact plate member 32A.

Similarly, the abutting side surface 47 of the right abutment section 35 of the rear attachment member 31A is in surface contact with a rear end portion of the outer surface 32b of the restraint plate 40 of the right contact plate member 32A, and the abutting end surface 48 of the right abutment section 35 of the rear attachment member 31A is in surface contact with a rear end portion of the upper surface 41b of the reinforcement plate 41 of the right contact plate member 32A. The abutting side surface 47 of the left abutment section 35 of the rear attachment member 31A is in surface contact with a rear end portion of the outer surface 32b of the restraint plate 40 of the left contact plate member 32A, and the abutting end surface 48 of the left abutment section 35 of the rear attachment member 31A is in surface contact with a rear end portion of the upper surface 41b of the reinforcement plate 41 of the left contact plate member 32A.

The pair of attachment members 31A, 31A is joined to the pair of contact plate members 32A, 32A in the following manner. As shown in FIG. 5, the paired attachment members 31A, 31A are disposed at a distance from each other in the front-and-rear direction such that the flange portions 31a, 31a are located between the support plate portions 31b, 31b in plan view. Subsequently, the paired contact plate members 32A, 32A are disposed at a distance from each other in the left-and-right direction such that the respective reinforcement plates 41, 41 extend outward in the left-and-right direction with respect to the respective restraint plates 40, 40. At this time, each of the pair of contact plate members 32A, 32A is disposed with the outer surface 32b of the restraint plate 40 and the upper surface 41b of the reinforcement plate 41 being in contact with their adjacent abutment sections 35, 35 of the attachment members 31A, 31A. Subsequently, each rib plate 42 is disposed in contact with the outer surface 32b of the restraint plate 40 and the upper surface 41b of the reinforcement plate 41 and in contact with the abutment section 35 of the attachment member 31A. In the present embodiment, the two rib plates 42 are disposed in contact with respective ones of the rear surfaces (surfaces facing rearward) of the paired abutment sections 35, 35 of the front attachment member 31A, and the two rib plates 42 are disposed in contact with respective ones of the front surfaces (surfaces facing frontward) of the paired abutment sections 35, 35 of the rear attachment member 31A.

As shown in the enlarged view of FIG. 5, arranging each of the components in the manner described above allows the outer surface 32b of each restraint plate 40 to be in surface contact with its respective adjacent abutting side surfaces 47, 47 of the attachment members 31A, 31A and allows the upper surface 41b of each reinforcement plate 41 to be in surface contact with its respective adjacent abutting end surfaces 48, 48 of the attachment members 31A, 31A.

In this state of arrangement, each of the boundary areas between the rib plate 42, the reinforcement plate 41 and the restraint plate 40 and their adjacent abutment section 35 is secured by performing welding therealong. Consequently, each of the pair of contact plate members 32A, 32A is supported on the pair of attachment members 31A, 31A with both the outer surface 32b of the restraint plate 40 and the upper surface 41b of the reinforcement plate 41 being in surface contact with the pair of attachment members 31A, 31A.

The track guide 30A shown in FIGS. 5 to 7 allows, similarly to the track guide 30 shown in FIGS. 2 to 4, the track link 25b to pass through between the restraint plate 40 of the right contact plate member 32A and the restraint plate 40 of the left contact plate member 32A during a circular motion of the crawler belt 25, with the gap G left between the inner surface 32a of each restraint plate 40 and the track link 25b, as shown in FIG. 4. The right contact plate member 32A is configured to, when the track link 25b has come into contact with the inner surface 32a of the restraint plate 40 thereof due to rightward displacement of the crawler belt 25 with respect to the crawler frame 22, stop the rightward motion of the track link 25b. This makes it possible to restrain the track link 25b from rightward displacement. The left contact plate member 32A is configured to, when the track link 25b has come into contact with the inner surface 32a of the restraint plate 40 thereof due to leftward displacement of the crawler belt 25 with respect to the crawler frame 22, stop the leftward motion of the track link 25b. This makes it possible to restrain the track link 25b from leftward displacement.

The track link 25b may come into collision with the contact plate member 32A from diagonally below due to a great inclination of the crawler belt 25, but usually comes into collision with the inner surface 32a of the restraint plate 40 of the contact plate member 32A as a result of its displacement toward the inner surface 32a in the left-and-right direction. In the present embodiment, in either of the above-mentioned cases where the track link 25b comes into collision with the contact plate member 32A from diagonally below or comes into collision with the contact plate member 32A as a result of its displacement in the left-and-right direction, each of the contact plate members 32A, 32A is effectively supported on the pair of attachment members 31A, 31A via the above-described surface contact portions. This makes it possible to effectively suppress deformation of each contact plate member 32A in spite of its restraint plate 40 having a small plate thickness.

In addition, the track guide 30A can be easily attached to and detached from the crawler frame 22 in spite of its inclusion of the reinforcement plates 41, owing to the pair of recesses 41a, 41a formed in each reinforcement plate 41 as described above.

As shown in FIG. 8, the pair of recesses 41a, 41a are formed so that the reinforcement plate 41 does not overlap the through-hole 33 of the front attachment member 31A and the through-hole 33 of the rear attachment member 31A in plan view (FIG. 8 is a bottom view). This makes it possible to secure the space necessary for tightening the fixing bolts B1 to attach the track guide 30A to the crawler frame 22. In other words, in order to tighten the fixing bolt B1 having been inserted in the through-hole 33 into the fixing hole 22a of the crawler frame 22, it is necessary to fit a predetermined tool to the head of the fixing bolt B1 from below and rotate the tool forcefully.

Specifically, a rod socket wrench is fitted to the fixing bolt B1 such that the respective axes coincide, and a cross handle is fitted to the rod socket wrench in orthogonal directions to each other, for example. In this state, the cross handle is turned to tighten the fixing bolt B1. To perform this work, it is necessary to provide a space, under the through-hole 33, sufficient to enable fitting these tool components and performing the above-mentioned work.

In the track guide 30A according to the present embodiment, the reinforcement plate 41 has the pair of recesses 41a, 41a to leave the space under each through-hole 33. This makes it possible to tighten the fixing bolts B1 without difficulty, not being hindered by the reinforcement plate 41. Therefore, the track guide 30A can be easily attached to and detached from the crawler frame 22.

Further, since each attachment member 31A includes the above-described outer ribs 45 and inner ribs 46 disposed at the right end portion and the left end portion thereof, the rigidity of each attachment member 31A is structurally reinforced. This makes it possible to form each through-hole 33 at a position closer to the edge of the flange portion 31a. This in turn makes it possible to increase the gap G between the track link 25b and the contact plate member 32A (the inner surface 32a of the restraint plate 40). Furthermore, since the fixing bolt B1 is disposed between the outer rib 45 and the inner rib 46, it is possible to prevent collision of a rock or stone with the fixing bolt B1.

As described above, the hydraulic excavator 1 having the track guide 30A mounted thereon makes it possible to increase the gap G between the track link 25b and the contact plate member 32A to thereby reduce the frequency of their contact and the impact at the time of their contact. This therefore makes it possible to suppress the wear of both the track guide 30A and the track link 25b and thereby increase their durability. Furthermore, since the weight of the track guide 30A can be reduced, the burden of replacing it will also be reduced to achieve excellent workability.

[Modification of the Improved Track Guide 30A]

Figure 9:
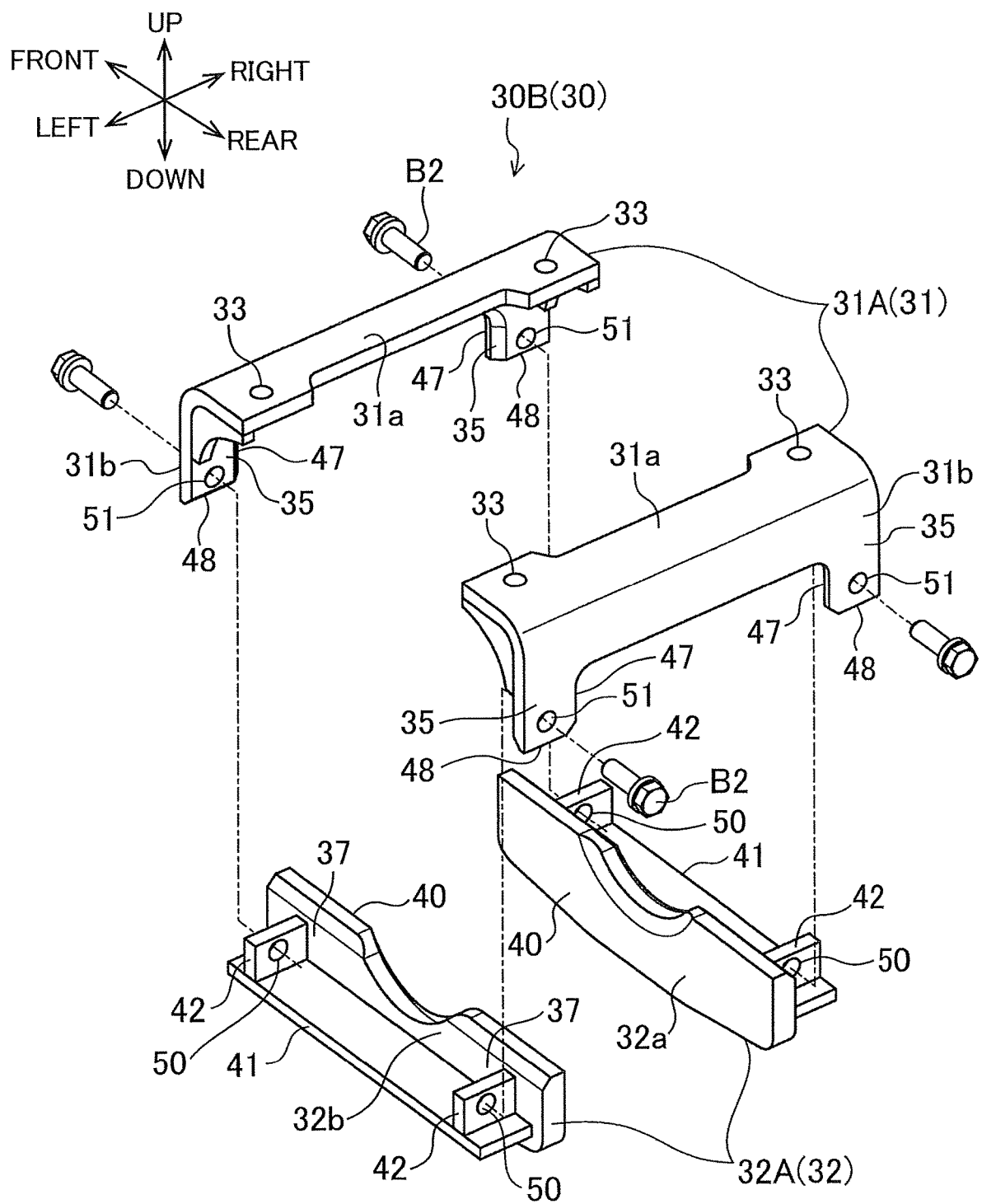
FIG. 9 is a schematic perspective view of a modification of the track guide embodying the disclosed technique (the improved track guide).

FIG. 9 is a perspective view of a modification of the track guide 30A. A track guide 30B according to this modification differs from the track guide 30A shown in FIG. 5 in that each of a pair of contact plate members 32A, 32A is detachably attached to each of a pair of attachment members 31A, 31A.

Specifically, as shown in FIG. 9, in the track guide 30B, each of rib plates 42 of each contact plate member 32A has a fastening hole 50 passing through the rib plate 42 in the front-and-rear direction. In addition, each of abutment sections 35 of each attachment member 31A has an insertion hole 51 passing through the abutment section 35 in the front-and-rear direction.

In this modification, the pair of attachment members 31A, 31A and the pair of contact plate members 32A, 32A are joined in the following manner. In the modification shown in FIG. 9, similarly to the track guide 30A shown in FIG. 5, the paired contact plate members 32A, 32A are assembled to the paired attachment members 31A, 31A such that an outer surface 32b of each restraint plate 40 is in surface contact with its respective adjacent abutting side surfaces 47, 47 of the attachment members 31A, 31A and an upper surface 41b of each reinforcement plate 41 is in surface contact with its respective adjacent abutting end surfaces 48, 48 of the attachment members 31A, 31A. At this time, each rib plate 42 is in contact with its respective adjacent abutment section 35 with each insertion hole 51 communicating with its respective adjacent fastening hole 50. Subsequently, a joint bolt B2 is tightened into each pair of the insertion hole 51 and the fastening hole 50 communicating with each other, whereby each contact plate member 32A is detachably secured to each attachment member 31A.

This track guide 30B allows each attachment member 31A to be independently attached to the crawler frame 22. In other words, each attachment member 31A can be attached to the crawler frame 22 without the pair of contact plate members 32A, 32A attached thereto. This makes it possible to provide a space under a pair of through-holes 33, 33 of each attachment member 31A when a fixing bolt B1 for attaching each attachment member 31A to the crawler frame 22 is to be tightened. Therefore, in this modification, the reinforcement plate 41 does not need to have a pair of recesses 41a, 41a as in the track guide 30A shown in FIG. 5. This allows, as shown in FIG. 9, the reinforcement plate 41 according to this modification to have a great width (e.g. a substantially constant width) over its entire length, i.e. from the front end to the rear end thereof.

Consequently, the reinforcement plate 41 is further reinforced, which makes it possible to further increase the rigidity of the improved contact plate member 32A.

In addition, in this modification, the reinforcement plate 41 of the right contact plate member 32A is located under the right through-holes 33 and the fixing bolts B1 passing through the right through-holes 33 and overlaps the right through-holes 33 and the fixing bolts B1 in plan view. The reinforcement plate 41 of the left contact plate member 32A is located under the left through-holes 33 and the fixing bolts B1 passing through the left through-holes 33 and overlaps the left through-holes 33 and the fixing bolts B1 in plan view. This therefore also makes it possible to prevent a rock or stone from coming into collision with the fixing bolt B1 from below. For example, the reinforcement plate 41 may be formed to cover lower parts of the tightened fixing bolts B1.

In this modification, each attachment member 31A can be independently attached to the crawler frame 22 and each contact plate member 32A can be independently attached to the pair of attachment members 31A, 31A. This makes it possible to reduce the weight of each component handled in the work of its attachment. Furthermore, when one of the pair of contact plate members 32A, 32A is worn out, the one contact plate member 32A can only be independently replaced. This makes it possible to further reduce the burden of the replacement work and thereby improve the workability.

This modification, which enables independent replacement of the contact plate member 32A, makes it possible to use as a material of the contact plate member 32A a softer material (such as a soft steel) than the material of the attachment member 31A. In this case, the contact plate member 32A is allowed to more easily wear out than the case of being made of the same material as that of the attachment member 31A. This makes it possible to more effectively suppress the wear of the track link 25b.

In this modification, since each attachment member 31A can be independently attached to the crawler frame 22, the track guide 30B is applicable to different types of working machines that require different intervals of attachment of the attachment members 31A, 31A. Since the track guide 30B can be shared between different types of working machines, it is highly versatile. The shape of the contact plate member 32A can also be varied, such as increasing its entire length or width, according to the specifications. This further makes the track guide 30B highly versatile.

In the above-described embodiment and the modification, the guided portion is in the form of a track link, but the guided portion may not necessarily be in the form of the track link. The guided portion may be one of the structural components of the crawler belt other than the track link. Further, the guided portion may be a member independent of the belt body of the crawler belt or a member integrated with the belt body.

As described above, a working machine is provided that is capable of suppressing the wear of both the track guide and the track link and reducing the burden of replacing these components.

Provided is a working machine comprising a lower travelling body including a pair of crawler track units, and a machine body mounted on the lower travelling body.

Each of the pair of crawler track units includes an idler wheel and a drive wheel, a crawler frame rotatably supporting the idler wheel and the drive wheel at a front end portion and a rear end portion of the crawler frame, a crawler belt having a belt body wound in a loop around the idler wheel and the drive wheel and a guided portion projecting inward from an inner surface of the belt body, the crawler belt being circulated by driving the drive wheel, a lower guide roller, rotatably supported on a lower part of the crawler frame, for guiding the crawler belt in a circular motion, and a track guide for restraining the crawler belt from displacement in a left-and-right direction.

The track guide includes a front attachment member and a rear attachment member disposed respectively in front of and behind the lower guide roller and extending along a rotational axis of the lower guide roller, each of the attachment members being detachably attached to the crawler frame, a right contact plate member laid between a right end portion of the front attachment member and a right end portion of the rear attachment member, and a left contact plate member laid between a left end portion of the front attachment member and a left end portion of the rear attachment member.

Each of the right contact plate member and the left contact plate member includes a restraint plate having an inner surface facing inward in the left-and-right direction and an outer surface facing outward in the left-and-right direction, and a reinforcement plate projecting outward from the outer surface of the restraint plate in the left-and-right direction and having an upper surface. The guided portion is configured to be capable of passing through between the restraint plate of the right contact plate member and the restraint plate of the left contact plate member during the circular motion of the crawler belt, with a gap left between the inner surface of each restraint plate and the guided portion. The right contact plate member is configured to restrain the guided portion from rightward displacement by contact of the inner surface of the restraint plate of the right contact plate member with the guided portion due to rightward displacement of the crawler belt with respect to the crawler frame. The left contact plate member is configured to restrain the guided portion from leftward displacement by contact of the inner surface of the restraint plate of the left contact plate member with the guided portion due to leftward displacement of the crawler belt with respect to the crawler frame. Each of the right contact plate member and the left contact plate member is supported on the front attachment member and the rear attachment member with both the outer surface of the restraint plate and the upper surface of the reinforcement plate being in surface contact with the front attachment member and the rear attachment member.

Thus, the working machine includes the track guide for restraining the crawler belt from displacement in the left-and-right direction (lateral displacement of the crawler belt) with respect to the crawler frame. The track guide is disposed to enclose the lower guide roller configured to come into contact with the guided portion of the crawler belt in a circular motion to thereby guide the guided portion. The track guide includes the pair of contact plate members (the right contact plate member and the left contact plate member) each laid between the paired attachment members (the front attachment member and the rear attachment member). Each of the contact plate members includes the restraint plate and the reinforcement plate projecting outward from the restraint plate in the left-and-right direction. Each of the pair of contact plate members is supported on the pair of attachment members with both the outer surface of the restraint plate and the upper surface of the reinforcement plate being in surface contact with each of the pair of attachment members.

Therefore, the rigidity of the restraint plate is structurally reinforced with the reinforcement plate. This allows the restraint plate of each of the pair of contact plate members to have a smaller plate thickness than the case without the above-described reinforcement plate. This makes it possible to increase the gap between the guided portion of the crawler belt and the inner surface of each of the restraint plates. The increase of the gap between the guided portion of the crawler belt and the inner surface of each restraint plate will reduce the frequency of their contact and the impact at the time of their contact. This makes it possible to suppress the wear of both of these components. In addition, since the weight of the track guide can be reduced, the burden of replacing these components will also be reduced.

The guided portion (e.g. a track link) of the crawler belt may come into collision with the contact plate member from diagonally below due to a great inclination of the crawler belt. However, except for this case, the guided portion usually comes into collision with the inner surface of the restraint plate of the contact plate member as a result of its displacement toward the inner surface in the left-and-right direction. Since each of the pair of contact plate members is supported on the pair of attachment members with both the outer surface of the restraint plate and the upper surface of the reinforcement plate being in surface contact with each of the pair of attachment members, each of the pair of contact plate members is effectively supported on the pair of attachment members via the surface contact portions, in either of the above-mentioned cases where the guided portion comes into collision with the contact plate member from diagonally below or comes into collision with the contact plate member as a result of its displacement in the left-and-right direction. This makes it possible to effectively suppress deformation of each of the contact plate members in spite of its restraint plate having a small plate thickness.

In the above-described working machine, it is preferable that each of the front attachment member and the rear attachment member includes a flange portion extending in the left-and-right direction and having a pair of through-holes each passing through the flange portion in an up-and-down direction and allowing a fastening member for attaching the flange portion to the crawler frame to pass therethrough, and a support plate portion projecting downward from the flange portion to the right contact plate member and the left contact plate member, that the pair of through-holes includes a right through-hole located at the right side of the restraint plate of the right contact plate member in plan view and a left through-hole located at the left side of the restraint plate of the left contact plate member in plan view, that the reinforcement plate of the right contact plate member has a recess defined by a right surface recessed leftward at positions that correspond to the respective right through-holes of the front and rear attachment members in plan view so as to avoid overlapping the right through-holes in plan view, and that the reinforcement plate of the left contact plate member has a recess defined by a left surface recessed rightward at positions that correspond to the respective left through-holes of the front and rear attachment members in plan view so as to avoid overlapping the left through-holes in plan view.

In the work of inserting the fastening members into the through-holes and tightening them to attach the flange portion to the crawler frame, it is necessary to fit a predetermined tool to the fastening member having been inserted in the through-hole of the flange portion from below the fastening member and move the tool (e.g. turn the tool forcefully). To perform this work, it is necessary to provide a space, under each through-hole, sufficient to enable the work of fitting the tool to the fastening member and moving the tool.

In view of such object, in the track guide according to the above-described configuration, the reinforcement plate has a side surface recessed inward in the left-and-right direction at positions that face the corresponding through-holes of the flange portions in plan view. This makes it possible to allow performing the fastening work without difficulty while increasing the rigidity of the restraint plate with the reinforcement plate. This configuration therefore makes it possible both to suppress the wear of the track guide and the guided portion and to allow easy attachment and detachment of the track guide.

Further, in the above-described working machine, it is preferable that each of the front attachment member and the rear attachment member includes a flange portion extending in the left-and-right direction and having a pair of through-holes each passing through the flange portion in an up-and-down direction and allowing a fastening member for attaching the flange portion to the crawler frame to pass therethrough, and a support plate portion projecting downward from the flange portion to the right contact plate member and the left contact plate member, that the pair of through-holes includes a right through-hole located at the right side of the restraint plate of the right contact plate member in plan view and a left through-hole located at the left side of the restraint plate of the left contact plate member in plan view, and that each of the right contact plate member and the left contact plate member is detachably attached to each of the front attachment member and the rear attachment member.

In this configuration, the above-mentioned fastening work, i.e. the work of inserting the fastening members into the through-holes and tightening them to attach the flange portion to the crawler frame, is performed with the pair of contact plate members detached from the pair of attachment members. This makes it possible to secure the space, under each through-hole of the flange portion, sufficient to enable fitting the tool to the fastening member and moving the tool. This makes it possible to allow performing the fastening work without difficulty while increasing the rigidity of the restraint plate with the reinforcement plate.

Moreover, this configuration makes it possible to independently perform the work of attaching each of the pair of attachment members to the crawler frame and the work of attaching each of the pair of contact plate members to the pair of attachment members. This makes it possible, compared to the case where the pair of contact plate members is undetachably secured to the pair of attachment members, to reduce the weight of each component handled in the work of its attachment. Furthermore, this configuration makes it possible, when one of the pair of contact plate members is worn out, to replace only the one contact plate member independently. This makes it possible to further reduce the burden of the replacement work and thereby improve the workability.

In addition, this configuration makes it possible, by selecting the material of the pair of contact plate members (specifically, the material of the restraint plates) and the material of the guided portion of the crawler belt in such a way as to allow the pair of contact plate members to more easily wear out than the guided portion of the crawler frame, to more effectively suppress the wear of the guided portion of the crawler belt. Moreover, since this configuration allows each of the pair of contact plate members to be detachably attached to the pair of attachment members, it is possible, in different types of working machines that require different lengths of the contact plate members in the front-and-rear direction, to locate the paired attachment members at a distance from each other (at an attachment interval) in the front-and-rear direction according to the length of the contact plate members in the front-and-rear direction. Furthermore, this configuration makes it possible to vary the shape of the contact plate members, such as increasing their entire length or width, according to the specifications. This therefore makes the track guide highly versatile.

In the case where each of the pair of contact plate members is detachably attached to each of the pair of attachment members as described above, it is preferable that the reinforcement plate of the right contact plate member is located under the right through-holes and the fastening members passing through the right through holes and overlaps the right through-holes and the fastening members in plan view, and that the reinforcement plate of the left contact plate member is located under the left through-holes and the fastening members passing through the left through holes and overlaps the left through-holes and the fastening members in plan view.

This configuration allows the reinforcement plate to project outward from the outer surface of the restraint plate in the left-and-right direction over the area that overlaps the through-holes in plan view, without being restricted by the positions of the through-holes in the flange portion. This makes it possible to increase the strength of the reinforcement plate and thereby further increase the rigidity of the contact plate member. Furthermore, this configuration allows the reinforcement plate to prevent a rock or stone approaching from the ground from coming into collision with the fastening member from below.

In the above-described working machine, it is preferable that at least one of the front attachment member and the rear attachment member further includes at least one of a rib disposed at the right end portion and connected to the support plate portion and the flange portion of the at least one attachment member and a rib disposed at the left end portion and connected to the support plate portion and the flange portion of the at least one attachment member.

In this configuration, the rigidity of at least one of the right end portion and the left end portion of the at least one attachment member can be structurally reinforced. This makes it possible to form the through-hole at a position further closer to the edge of the flange portion. Therefore, the restraint plate of the contact plate member can be located at a more outer position in the left-and-right direction. This makes it possible to further increase the gap between the guided portion of the crawler belt and the inner surface of the restraint plate. Furthermore, the rib is allowed to prevent a rock or stone approaching from the ground from laterally coming into collision with the fastening member.

This application is based on Japanese Patent application No. 2019-113067 filed in Japan Patent Office on Jun. 18, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A working machine, comprising:
   a lower travelling body including a pair of crawler track units; and
   a machine body mounted on the lower travelling body,
   wherein each of the pair of crawler track units includes
      an idler wheel and a drive wheel,
      a crawler frame rotatably supporting the idler wheel and the drive wheel at a front end portion and a rear end portion of the crawler frame,
      a crawler belt having a belt body wound in a loop around the idler wheel and the drive wheel and a guided portion projecting inward from an inner surface of the belt body, the crawler belt being circulated by driving the drive wheel,
      a lower guide roller, rotatably supported on a lower part of the crawler frame, for guiding the crawler belt in a circular motion, and
      a track guide for restraining the crawler belt from displacement in a left-and-right direction,
   wherein the track guide includes
      a front attachment member and a rear attachment member disposed respectively in front of and behind the lower guide roller and extending along a rotational axis of the lower guide roller, each of the attachment members being detachably attached to the crawler frame,
      a right contact plate member laid between a right end portion of the front attachment member and a right end portion of the rear attachment member, and a left contact plate member laid between a left end portion of the front attachment member and a left end portion of the rear attachment member, wherein each of the right contact plate member and the left contact plate member includes a restraint plate having an inner surface facing inward in the left-and-right direction and an outer surface facing outward in the left-and-right direction, and a reinforcement plate projecting outward from the outer surface of the restraint plate in the left-and-right direction and having an upper surface, wherein the guided portion is configured to be capable of passing through between the restraint plate of the right contact plate member and the restraint plate of the left contact plate member during the circular motion of the crawler belt, with a gap left between the inner surface of each restraint plate and the guided portion, wherein the right contact plate member is configured to restrain the guided portion from rightward displacement by contact of the inner surface of the restraint plate of the right contact plate member with the guided portion due to rightward displacement of the crawler belt with respect to the crawler frame, wherein the left contact plate member is configured to restrain the guided portion from leftward displacement by contact of the inner surface of the restraint plate of the left contact plate member with the guided portion due to leftward displacement of the crawler belt with respect to the crawler frame, and wherein each of the right contact plate member and the left contact plate member is supported on the front attachment member and the rear attachment member with both the outer surface of the restraint plate and the upper surface of the reinforcement plate being in surface contact with the front attachment member and the rear attachment member, wherein each of the front attachment member and the rear attachment member includes a flange portion extending in the left-and-right direction and having a pair of through-holes each passing through the flange portion in an up-and-down direction and allowing a fastening member for attaching the flange portion to the crawler frame to pass therethrough, and a support plate portion projecting downward from the flange portion to the right contact plate member and the left contact plate member, wherein the pair of through-holes includes a right through-hole located at a right side of the restraint plate of the right contact plate member in plan view and a left through-hole located at a left side of the restraint plate of the left contact plate member in plan view, wherein the reinforcement plate of the right contact plate member has a recess defined by a right surface recessed leftward at positions that correspond to the respective right through-holes of the front and rear attachment members in plan view so as to avoid overlapping the right through-holes in plan view, and wherein the reinforcement plate of the left contact plate member has a recess defined by a left surface recessed rightward at positions that correspond to the respective left through-holes of the front and rear attachment members in plan view so as to avoid overlapping the left through-holes in plan view.

2. The working machine according to claim 1, wherein at least one of the front attachment member and the rear attachment member further includes at least one of a rib disposed at the right end portion and directly connected to the support plate portion and the flange portion of the at least one attachment member and a rib disposed at the left end portion and directly connected to the support plate portion and the flange portion of the at least one attachment member.

3. A working machine, comprising:

a lower travelling body including a pair of crawler track units; and a machine body mounted on the lower travelling body, wherein each of the pair of crawler track units includes an idler wheel and a drive wheel, a crawler frame rotatably supporting the idler wheel and the drive wheel at a front end portion and a rear end portion of the crawler frame, a crawler belt having a belt body wound in a loop around the idler wheel and the drive wheel and a guided portion projecting inward from an inner surface of the belt body, the crawler belt being circulated by driving the drive wheel, a lower guide roller, rotatably supported on a lower part of the crawler frame, for guiding the crawler belt in a circular motion, and a track guide for restraining the crawler belt from displacement in a left-and-right direction, wherein the track guide includes a front attachment member and a rear attachment member disposed respectively in front of and behind the lower guide roller and extending along a rotational axis of the lower guide roller, each of the attachment members being detachably attached to the crawler frame, a right contact plate member laid between a right end portion of the front attachment member and a right end portion of the rear attachment member, and a left contact plate member laid between a left end portion of the front attachment member and a left end portion of the rear attachment member, wherein each of the right contact plate member and the left contact plate member includes a restraint plate having an inner surface facing inward in the left-and-right direction and an outer surface facing outward in the left-and-right direction, and a reinforcement plate projecting outward from the outer surface of the restraint plate in the left-and-right direction and having an upper surface, wherein the guided portion is configured to be capable of passing through between the restraint plate of the right contact plate member and the restraint plate of the left contact plate member during the circular motion of the crawler belt, with a gap left between the inner surface of each restraint plate and the guided portion, wherein the right contact plate member is configured to restrain the guided portion from rightward displacement by contact of the inner surface of the restraint plate of the right contact plate member with the guided portion due to rightward displacement of the crawler belt with respect to the crawler frame, wherein the left contact plate member is configured to restrain the guided portion from leftward displacement by contact of the inner surface of the restraint plate of the left contact plate member with the guided portion due to leftward displacement of the crawler belt with respect to the crawler frame, and wherein each of the right contact plate member and the left contact plate member is supported on the front attachment member and the rear attachment member with both the outer surface of the restraint plate and the upper surface of the reinforcement plate being in surface contact with the front attachment member and the rear attachment member, wherein each of the front attachment member and the rear attachment member includes a flange portion extending in the left-and-right direction and having a pair of through-holes each passing through the flange portion in an up-and-down direction and allowing a fastening member for attaching the flange portion to the crawler frame to pass therethrough, and a support plate portion projecting downward from the flange portion to the right contact plate member and the left contact plate member, wherein the pair of through-holes includes a right through-hole located at a right side of the restraint plate of the right contact plate member in plan view and a left through-hole located at a left side of the restraint plate of the left contact plate member in plan view, and wherein each of the right contact plate member and the left contact plate member is detachably attached to each of the front attachment member and the rear attachment member, wherein the reinforcement plate of the right contact plate member is located under the right through-holes and the fastening members passing through the right through holes, and overlaps the right through-holes and the fastening members in plan view, and wherein the reinforcement plate of the left contact plate member is located under the left through-holes and the fastening members passing through the left through holes, and overlaps the left through-holes and the fastening members in plan view.

4. The working machine according to claim 3, wherein at least one of the front attachment member and the rear attachment member further includes at least one of a rib disposed at the right end portion and directly connected to the support plate portion and the flange portion of the at least one attachment member and a rib disposed at the left end portion and directly connected to the support plate portion and the flange portion of the at least one attachment member.

* * * * *